July 7, 1970  E. ZYCHAL  3,519,984
AIRCRAFT LANDING BEACON SYSTEM
Filed March 3, 1967  3 Sheets-Sheet 1
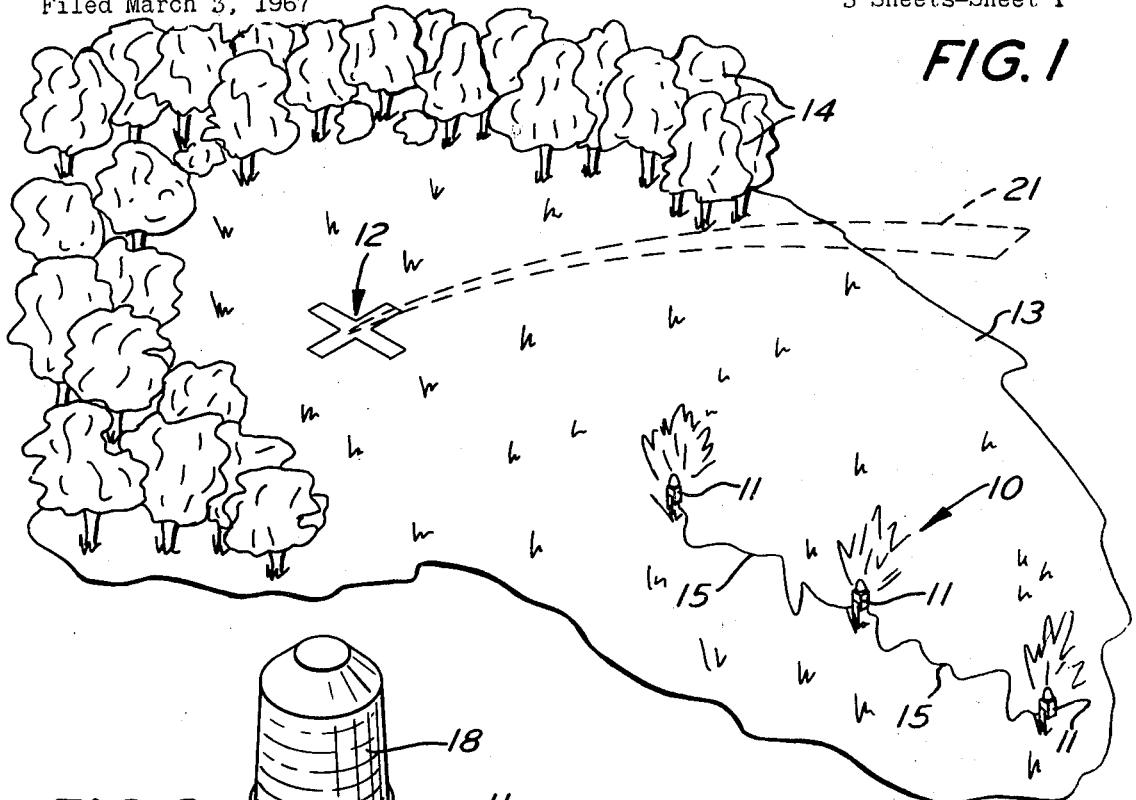
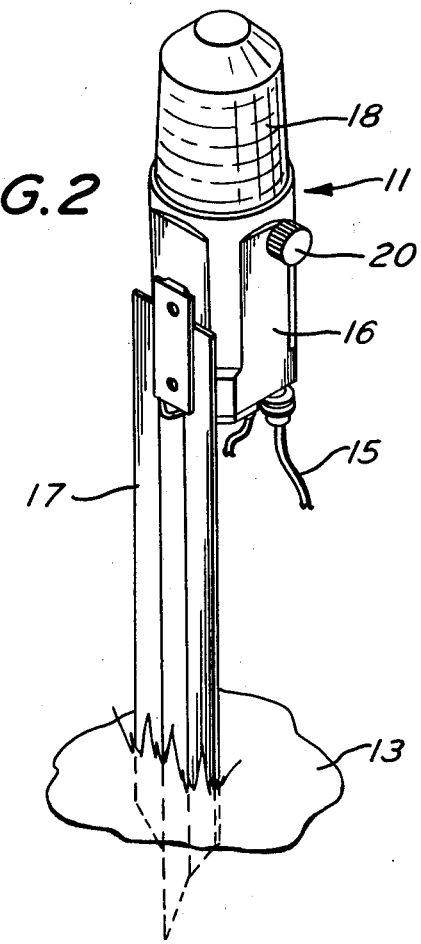
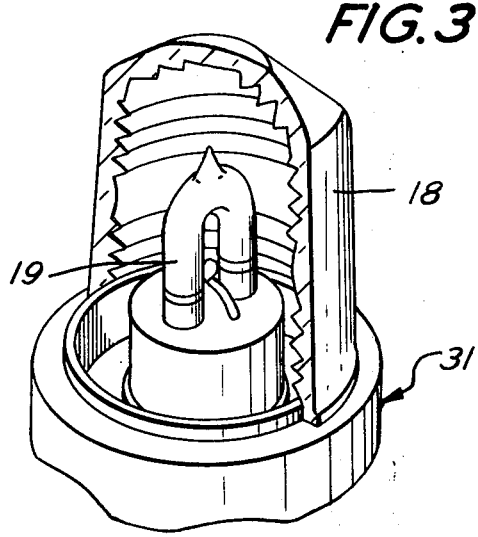
INVENTOR
EDWARD ZYCHAL
BY Donald M. Sandler
ATTORNEY

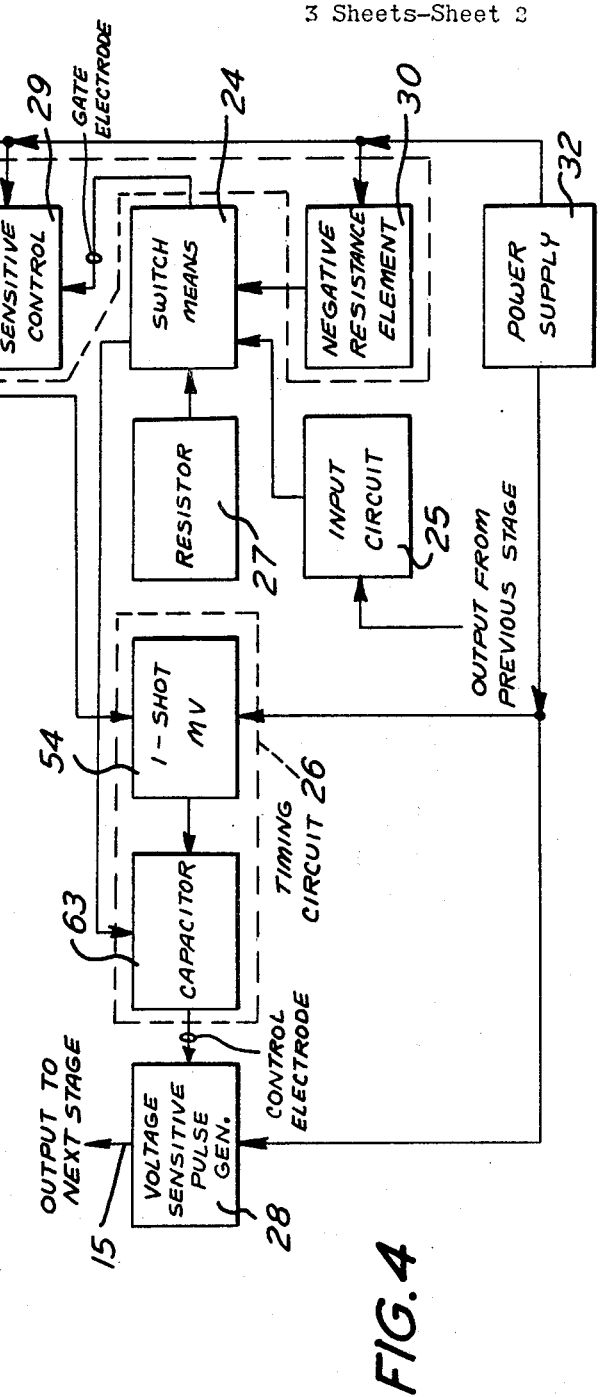

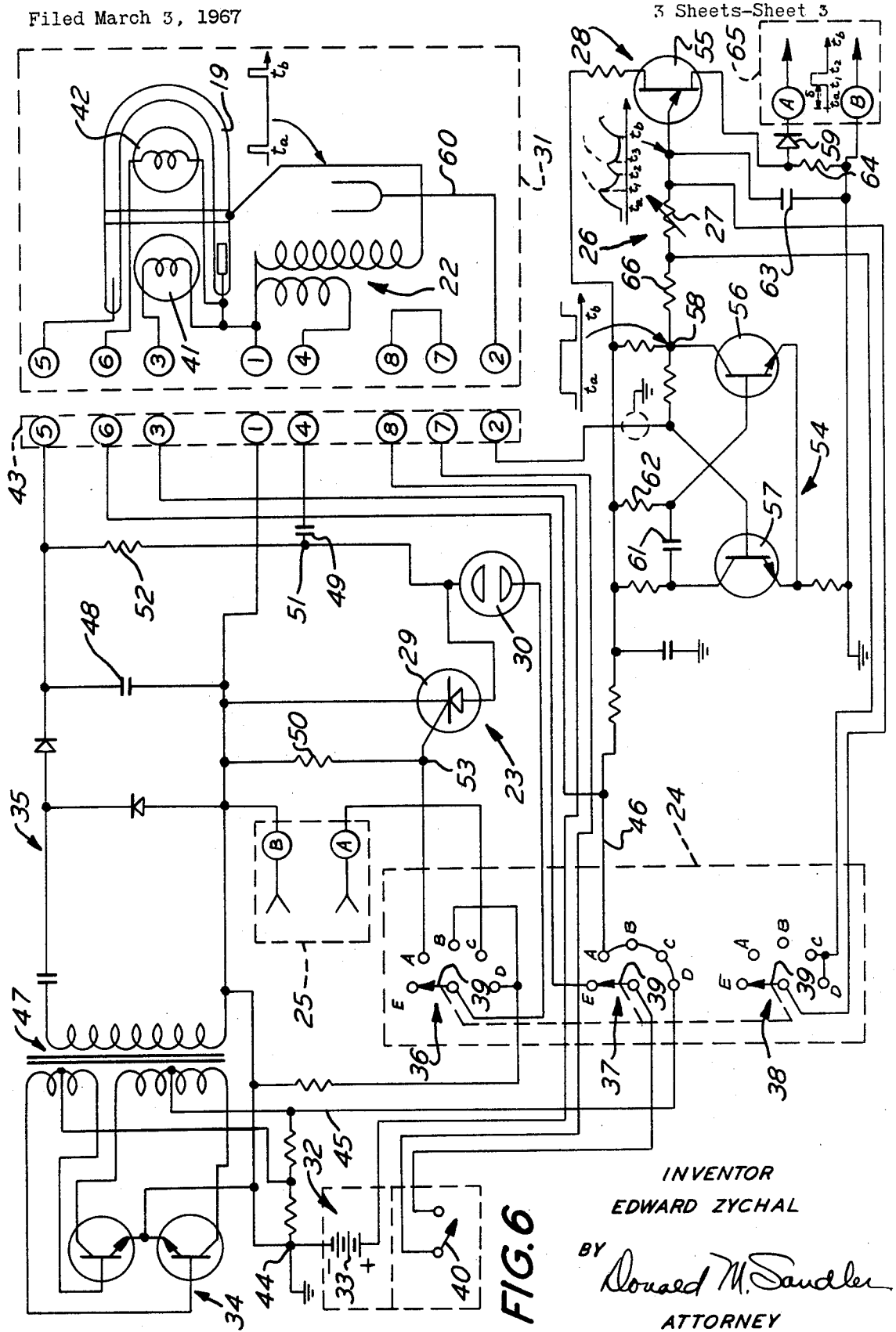

United States Patent Office 3,519,984
Patented July 7, 1970

3,519,984
AIRCRAFT LANDING BEACON SYSTEM
Edward Zychal, Bucks County, Pa., assignor to Elco Corporation, Willow Grove, Pa., a corporation of Delaware
Filed Mar. 3, 1967, Ser. No. 620,323
Int. Cl. B64f 1/18
U.S. Cl. 340—25                                14 Claims

ABSTRACT OF THE DISCLOSURE

A signal light is capable of producing high-intensity flashes in response either to periodically produced internal or external stimuli. A selectivity adjustable switch can be set to establish whether the signal light operates as a master to produce flashes in response to the internal stimuli, or as a slave to produce flashes in response to externally supplied stimuli. The signal light responds to its own flash by producing a stimulus, which, depending upon the switch setting, can occur with either perceptible or imperceptible delay relative to the flash, and which can be applied as an external stimulus to another slaved signal light. This capability permits a plurality of signal lights to be assembled into a chain to establish a system wherein the signal light at one end of the chain is the master and produces periodic flashes, and the remainder of the signal lights are serially connected to the master and are operated as slaves. A stimulus from the master is propagated along the chain of signal lights selectively causing the latter to produce what appears to an observer as simultaneous flashes or progressive flashes that travel the length of the chain depending upon the switch settings of the signal lights.

---

This invention relates to a flashing, high-intensity signal light designed to be serially connected in a chain to establish a landing light system.

It is sometimes necessary to quickly establish a temporary landing light system to guide movable-winged aircraft, such as helicopters or the like, into a cleared landing area at night. Such system is preferably in the form of discrete signal lights strung out in a predetermined pattern and arranged to produce intermittent high-intensity flashes in a regular fashion establishing time- and space-wise patterns of lights that identify the cleared area and facilitate airborne approach and landing. One such pattern is a linear array of signal lights arranged so that the flashes are periodic and appear simultaneously to an airborne observer at night as a line made up of a number of points of light. Another useful pattern using a linear array is achieved when the flashes progress down the chain of signal lights thus indicating the direction of the flight path, wind direction, etc. Other patterns are well-known, but each is based on an array of signal lights that flash simultaneously or in a progressive manner.

Establishing a landing light system quickly under emergency conditions could be facilitated by making each signal a self-powered device with control capability to operate either as a master or as a slave thus permitting all components of the system to be identical, and to operate either as master or slave in either a simultaneous or progressive mode. Providing a signal light with this flexibility is the primary object of ths invention.

Briefly, the invention involves providing, in a self-powered signal light having a flash tube, an oscillator switchable between a free-running mode producing periodic stimuli that trigger the flash tube to produce periodic flashes, and a quiescent mode receptive to external stimuli for causing the tube to produce a flash. Also provided is a pulse generator which is responsive to each triggering of the tube for producing a stimulus that occurs in time either perceptibly or imperceptibly after the flash. This stimulus is applied as an external stimulus to a succeeding slave signal light in a chain via an interconnecting cable. With this capability, a plurality of signal lights of the type described can be arranged in a predetermined spatial distribution with one operated as the master producing periodic flashes, and the remainder, serially connected to the master, being operated as slaves. Consequently, each stimulus from the master is propagated along the chain.

The more important features of this invention have thus been outlined rather broadly in order that the detailed description thereof that follows may be better understood, and in order that the contribution to the art may be better appreciated. There are, of course, additional features of the invention that will be described hereinafter which will also form the subject of the claims appended hereto. Those skilled in the art will appreciate that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

For an understanding of the invention reference is made to the following detailed description which should be considered in connection with the accompanying drawings, wherein:

FIG. 1 is a pictorial representation of a cleared landing area illustrating a landing light system for guiding aircraft to a safe landing;

FIG. 2 is a perspective view of a signal light used in the system shown in FIG. 1;

FIG. 3 is a perspective view in section of the light dome of the signal light shown in FIG. 2;

FIG. 4 is a block diagram of the electrical circuit employed with the signal light of the present invention;

FIG. 5 is a chart relating switch position to the mode of operation of the signal light; and FIG. 6 is a detailed schematic of the wiring of a signal light.

Referring now to FIG. 1, reference numeral 10 designates a landing light system comprising a plurality of master/slave signal lights 11 arranged in a predetermined linear pattern directed toward a landing area 12 on terrain 13 surrounded by trees 14. Lights 11 are connected electrically in serial fashion by cable 15.

Each light 11 comprises a casing 16 which is mounted on a separate stake 17 driven into terrain 13 to properly position the light so that lens-dome 18 is oriented skyward. Contained within lens-dome 18 is a triggerable Xenon flash tube 19 which, when selector switch 20 is manually set to the proper position, is operable in a master mode wherein the tube is triggered periodically by a control circuit contained within casing 16. Setting selector switch 20 to another position converts the operation of the light to a slave mode wherein the tube is triggered only by the application of an external trigger pulse. The circuitry contained in casing 16 is arranged to produce a trigger pulse each time the flash tube is triggered, and is constructed so that positioning of selector switch 20 determines whether the trigger pulse follows the triggering of the flash tube by a period of time small in comparison to the response time of the human eye or a period of time large in comparison to such response time. Where the period of time is small, the light is said to be operated in its simultaneous mode; and where the period of time is large, the light is said to be operated in its progressive mode.

One of the lights in system 10, usually the one most remote from landing area 12 is arranged as the master by properly positioning its selector switch. The remaining lights of system 10 are slaves and are operated in either the simultaneous or progressive mode. Assuming the selected mode is "progressive," the circuitry in casing 16 of the light permits a delay of from 50 to 200 milliseconds (ms.) between occurrence of a flash of high intensity light from the flash tube and the generation of a trigger pulse by the signal light producing the flash. Since the signal lights 11 are serially connected by cable 15, the trigger pulse produced by a given signal light in the system is applied to the next signal light causing the circuitry therein to trigger its flash tube. To an airborne helicopter observer at night, system 10 appears as pinpoints of light timewise and spacewise displaced so as to clearly indicate the direction in which a safe approach to a cleared region should be made. Such approach is suggested by arrow 21 in FIG. 1.

Before detailing the actual circuitry contained in casing 16 of each light, reference is made to FIG. 4 which is a simplified block diagram that functionally explains the operation of the schematic diagram (FIG. 6) of an actual signal light made in accordance with the teachings of the present invention. As seen in FIG. 4, flash tube 19 is actuatable in a conventional manner by trigger circuit 22 each time the latter is pulsed. Oscillator 23, switching means 24 and input circuit 25 are concerned with determining whether light signal 11 operates as a master or slave; while the switching means, timing circuit 26, resistor 27, and pulse generator 28 are concerned with whether signal light 11 operates in a simultaneous or progressive mode.

When switching means 24 is adjusted to a so-called master position at which the gate electrode of voltage sensitive control 29, which may include a silicon controlled rectifier, for example, is coupled to negative resistance element 30, which may be a neon tube for example, oscillator 23 is enabled and is free-running at a frequency depending upon the time constant of an R-C circuit in control 29. In such case, oscillator 23 pulses trigger circuit 22 each time the negative resistance element 30 applies to the gate electrode of control 29, a voltage that exceeds some pre-selected value, this event occurring periodically. On the other hand, when switching means 24 is adjusted to a so-called slave position at which only input circuit 25, rather than negative resistance element 30, is coupled to the gate electrode, oscillator 23 is disabled and operates in a quiescent mode, In this mode, input pulses from a source external to the signal light 11 under consideration, and applied to input circuit 25, are coupled to the gate electrode. By arranging to have these input pulses no less than the preselected value indicated above, oscillator 23 in its quiescent mode is responsive to such input pulses for causing the trigger circuit to be pulsed.

The above described function of switching means 24 is thus concerned with whether signal light 11 is to operate as a master unit or a slave unit. Switching means 24 has another function, however, and this concerns whether the mode of operation is to be simultaneous or progressive. As suggested previously, the terms "simultaneous" and "progressive" as used in this description of the invention are relative terms whose definitions are based on the response of a human eye, rather than to precise electronic time measurements of the relationship between a series of flashes. For example, it is well-known that a series of flashes of a duration exceeding about 1000 microseconds and commencing within 1000 microseconds appear to a human observer as having occurred simultaneously. Flashes occurring with a delay of several orders of magnitude more than this are observed as having occurred sequentially. With this explanation in mind, it can be understood how switching means 24 is used to determine the mode of operation of the signal light.

Considering first timing circuit 26, it is responsive to the pulsing of trigger circuit 22 for producing a time variable voltage at the control electrode of pulse generator 28. The latter produces an output pulse that is applied to the input circuit 25 of the next signal light 11 via cable 15, each time the voltage at the control electrode of generator 28 reaches a preselected value. When resistor element 27 is switched into the timing circuit 26 by properly positioning switch means 24, the time variable voltage produced by the timing circuit at the control electrode, subsequent to the pulsing of the trigger circuit, reaches the preselected value at which the pulse generator produces an output pulse, after an interval of time long compared to the response time of the human eye. In such case, the resultant output pulse would cause the trigger circuit of the subsequent signal light 11 to be pulsed, and a light flash generated, a perceptible time after the trigger circuit of the signal light under consideration was pulsed and produced its light flash. Consequently, the signal light is said to be operated in a progressive mode.

When, however, resistor element 27 is switched out of timing circuit 26 by switch means 24, the time variable voltage produced by the timing circuit reaches the preselected value, at which the pulse generator produces an output pulse in a period of time subsequent to the pulsing of the trigger circuit that is short compared to the response time of the human eye. As a consequence, the output pulse causes the light flash generated by the subsequent signal light to occur within an imperceptibly short time following the light flash from the signal light under consideration. The signal light, in such case, is said to be operated in a simultaneous mode.

The possiblity that each signal light can be operated as a master or a slave in either or simultaneous in progressive mode, permits the assembly of versatile and highly flexible landing light systems. Since each signal light is identical and contains its own power supply, the signal lights are adapted for use in emergency situations where only sufficient time is available to mount the signal lights and string cable from one to the next. The only other action involved is to select the type of operation (master or slave) and the mode (progressive or simultaneous). Selection is facilitated by using a four-position selector switch whose function at each position is outlined in the chart shown in FIG. 5. Note that when the type of operation is to be "master" (switch positions A and C), and the oscillator is enabled and there is no external input available to a signal light so operated. Note also that when the selected mode is "progressive" (switch positions A and B) the resistor is switched into the timing circuit, etc.

Reference is now made to FIG. 6 which is a schematic wiring diagram of an actual signal light built in accordance with the principles of the present invention. All of the circuitry of signal light 11 is contained in casing 16 except flash tube 19 and trigger circuit 22, which are mounted in cap 31 that plugs into jack 43 of casing 16. That is to say, casing 16 contains power supply 32, oscillator means 23, switch means 24, input circuit 25, timing circuit 26, switchable element 27, and pulse generator 28.

Power supply 32 includes battery 33, core-timed multivibrator 34 arranged as a D.C. to D.C. converter, and voltage doubler circuit 35. Switch means 24 is in the form of three ganged rotary switches 36, 37, and 38, each having a switch arm 39 settable at any one of five positions A, B, C, D, and E. When arms 39 of the three switches are set at position E (as shown in FIG. 6), on-off switch 40 is closed, and cap 31 is plugged into casing 16, battery 33 is connected across incandescent lamps 41 and 42. The circuit connected to the (+) side of battery 33 may be traced through shunt terminals 7 and 8 of jack 43 in cap 31, closed switch 40, arm 39, terminal E of switch 37 and terminal 6 of jack 43; and the circuit connected to the (−) or grounded side of battery 33 may be traced through terminal 1 of jack 43 to ground node 44. In this state of switch means 24, neither multivibrator 34 nor timing circuit 26 is operative since power leads 45 and 46 are disconnected from the (+) side of battery 33. Consequently, only lamps 41 and 42 are operative. This arrangement permits the signal light to be used as a marker and increases the flexibility of a system using these signal lights as components.

The signal light is operated as a master in the progressive mode when the switch arms 39 are set at position A. In this state of switch means 24, lamps 41 and 42 remain operative because arm 39 of switch 37 connects the (+) side of battery 33 to power lead 46 which is connected to terminal 3 of jack 43. In some instances, it is desirable to extinguish the incandescent lamps when the flash tube is to be operative and in such case, the connection between power lead 46 and terminal 3 would be dispensed with.

Power lead 45 is also connected to the (+) side of the battery with the result that multivibrator 34 becomes operative generating a characteristic square wave output across the secondary of power transformer 47. This A.C. signal is filtered and doubled by circuit 35 to produce about 450 volts across power capacitor 48, this voltage appearing across the electrodes of flash tube 19 via terminals 1 and 6 in jack 43. The voltage on power capacitor 48 is also connected to ground node 44 through a first shunt path comprising timing capacitor 49 serially connected to the primary of the pulse transformer of trigger circuit 22, and a second shunt path comprising neon tube 30 serially connected to bias resistor 50 via arm 39 and contact A of switch 36. As a consequence of this arrangement, the voltage at node 51 increases exponentially as capacitor 49 charges through timing resistor 52 until the breakdown voltage (120–125 v.) of tube 30 is reached, at which time tube 30 conducts sending a pulse of current through bias resistor 50. The voltage at gate electrode 53 of silicon controlled rectifier 29 thus rises above ground potential rendering SCR 29 conductive and permitting capacitor 49 to discharge to ground through the SCR. The end of the primary of the pulse transformer that is connected to terminal 4 of jack 43 is driven negative as a result, producing a large pulse across the secondary of the pulse transformer, such pulse being coupled by band 54 to ground through the Xenon gas in flash tube 19. As a consequence of this, the gas is ionized and tube 19 produces a high intensity flash as power capacitor 48 discharges through the gas. Neon tube 30 is deionized as capacitor 49 completes its discharge and SCR 29 is again inoperative. The voltage across the power capacitor again builds-up as does the voltage at node 51 until the ionization voltage of tube 30 is reached, whereupon the cycle is repeated. In this condition, oscillator means 23 is enabled, and runs freely at a frequency depending upon the time constant of resistor 52 and capacitor 49. Trigger circuit 22 is pulsed at this frequency causing tube 19 to flash at the same frequency.

Recalling that lead 46 is also connected to the (+) side of the battery, power will be supplied to one-shot multivibrator 54 which is a part of timing circuit 26, and also to the voltage sensitive pulse generator 28 which includes unijunction transistor 55. Multivibrator 54 includes a normally conductive (NC) active element 56 and a normally non-conductive (NNC) active element 57 in the form of a pair of transistors sharing a common emitter resistor. When power is applied to lead 46, the stable state of the multivibrator requires transistor 56 to conduct and transistor 57 to be cut-off. In this condition, the voltage at the collector 58 of transistor 56 is approximately the same as the voltage at the emitter of transistor 57 with the result that the emitter-base juncion of transistor 57 is back-biased maintaining the latter in a cut-off state. By proper selection of component values for the collector and emitter resistors for transistor 56, and a proper selection of collector resistors for unijunction 55, the voltage at node 58 will normally be at a level less than that required to turn-on the unijunction. Consequently, the voltage at the cathode of diode 59 will have a small positive-value.

When trigger circuit 22 is pulsed, a voltage is induced in a coil of wire 60 adjacent to the secondary of the pulse transformer of the trigger circuit as the trigger pulse is applied to tube 19. The polarity of the induced voltage is arranged to drive the voltage at the base of transistor 57 positive with the result that the emitter-base junction of the transistor is forward-biased into conduction. The resultant drop in collector voltage at transistor 57 is coupled through capacitor 61 to the base of transistor 56 rapidly driving it to cut-off as conduction of transistor 57 continues. Capacitor 61 then begins to charge through the low value emitter resistor and bias resistor 62, and the voltage at the base of transistor 56 increases exponentially until it forward biases the emitter-base junction of transistor 56. Conduction rapidly switches and the multivibrator returns to its stable state.

When the multivibrator switches to its quasi-stable state (at time $t_a$) capacitor 63 begins to charge toward the voltage at node 58 which is maintained at almost the battery voltage except for the drop due to the flow through the collector resistor of transistor 56, of base current to transistor 57 during the time the multivibrator remains in its quasi-stable state. When the voltage across capacitor 63 reaches the switching voltage of unijunction 55 (at time $t_1$), the latter is turned-on and a pulse of current flows through collector resistor 64 causing an increase in voltage at terminal A of output jack 65. Conduction of the unijunction occurs until capacitor 63 discharges to such an extent that the voltage drops below about 2 volts (at time $t_2$) when the unijunction turns-off. The flow of current through resistor 64 decreases thus producing at terminal A of jack 65 a pulse lasting the duration of the discharge of capacitor 63 ($t_2-t_1$). At this time ($t_2$) capacitor 63 begins to change, but before the switching voltage of the unijunction is reached, the multivibrator reverts to its stable state (at time $t_3$) and the capacitor discharges through conducting transistor 56. Thus, only one pulse is produced at the output jack 65 each time the flash tube 19 is triggered, such pulse following the flash by a period of time δ depending on the time constant established by capacitor 63 and the collector resistor of transistor 56, fixed resistor 66 and variable resistor 27. By proper selection of components, the delay in the output pulse relative to the flash is variable between 50 and 200 ms., depending upon the setting of adjustable resistor 27. As indicated previously, the output pulse is applied via cable 15 to the succeeding signal light in the chain. All of the above occurs when arm 39 of switches 36, 37, and 38 are at A position and the signal light operates as a master in the progressive node.

When arm 39 of the switches is moved to position B, timing circuit 26 and pulse generator 28 operate just the same as they did when the arm 39 of the switches were at position A. However, oscillator means 23 is disabled and switched into a quiescent state since node 53 at the control electrode of SCR 29 is now disconnected from tube 30 which, however, is connected by resistor 67 to ground. As a consequence, neon tube 30 operates as a conventional voltage regulator maintaining the voltage on capacitor 48 at about 350 volts. The signal light is thus in a slave mode ready to respond to an external stimulus applied at terminal A of input jack 25. A positive-going pulse from the signal light ahead of this signal light is applied to terminal A and serves to open SCR 29 allowing capacitor 49 to discharge thus pulsing trigger circuit 22 and producing a flash from tube 19. As previously described, a pulse appears at terminal A of output jack 65 a time δ after the flash. Thus, the signal light operates as a slave in the progressive mode.

In order for the signal light to operate as either a slave or master in the simultaneous mode, it is necessary for resistor 27 to be shunted from the timing circuit 26. In such case, capacitor 63 will charge through the collector resistor of transistor 56, and fixed resistor 66 causing the voltage at the emitter of unijunction transistor 55 to reach the switching voltage an imperceptible time subsequent to the occurrence of the triggering of trigger circuit 22. Resistor 27 is shunted from the timing circuit 26 when switch arm 39 is engaged with either contact C or contact D, since in these positions, switch arm 39 of switch 38 effectively shorts resistor 27.

When switch arm 39 is rotated to engage contact C, oscillator 23 is enabled and performs in exactly the same manner as it performed when switch arm 39 was in position A. That is to say, oscillator 23 is in a free-running mode, and thus the signal light is operated as a master. The difference between the performance of the signal light when switch arm 39 is engaged with contact C as compared to when it is engaged with contact A, lies in the more rapid manner in which capacitor 63 is charged to the voltage at which the unijunction transistor 55 will be turned on. On the other hand, when switch arm 39 is rotated into engagement with contact D, the oscillator 23 is disabled and operates in a quiescent mode awaiting the application of an external signal to terminal A of input jack 25 for the purpose of pulsing trigger circuit 22 and causing tube 19 to emit a high-intensity light flash. Thus the circuit shown in FIG. 6 will operate either as a master or a slave in the simultaneous mode when switch arm 39 is engaged with contacts C or D.

From the above description, those skilled in the art will now appreciate that the present invention discloses a highly flexible and versatile signal light which permits a landing light system to be constructed from identical signal lights interconnected by cable. A simple adjustment to each signal light permits rapid conversion of a light from operation as a master to a slave or vice versa, and conversion of the mode of operation from simultaneous or progressive or vice versa.

I claim:

1. A master/slave signal light having a flash tube actuable by a trigger circuit each time the latter is pulsed, comprising:
   (a) power supply means adapted to furnish power to said flash tube;
   (b) oscillator means connected to said power supply and having a free-running mode when enabled for periodically pulsing said trigger circuit;
   (c) switch means selectively adjustable to a master position that enables said oscillator means causing it to operate in its free-running mode, and to a slave position that disables said oscillator means causing it to operate in a quiescent mode; and
   (d) input circuit means adapted to receive input pulses of predetermined value from a source external to said signal light, said input circuit being associated with said oscillator means and responsive to an input pulse applied to said input circuit for pulsing the trigger circuit when said oscillator means is disabled.

2. A master/slave signal light according to claim 1 wherein:
   (a) said oscillator means includes a voltage sensitive control element having a gate electrode and a negative resistance element;
   (b) said control element serves to initiate pulsing of the trigger circuit each time the voltage at the gate electrode reaches said predetermined value;
   (c) said negative resistance element serves to apply, periodically, a voltage of said predetermined value to said gate electrode when said negative resistance element is connected thereto;
   (d) said switch means when in its master position, connecting said negative resistance element to said gate electrode whereby the oscillator means is enabled and operates in its free-running mode; and
   (e) said switch means, when in its slave position, disconnecting said negative resistance element from said gate electrode whereby the oscillator means is disabled and operates in its quiescent mode.

3. A master/slave signal light according to claim 1 including:
   (a) a voltage sensitive pulse generator having a control electrode for producing a pulse adapted to be applied to the input circuit means of another, like, master/slave light, each time the voltage at said control electrode reaches a preselected value;
   (b) timing circuit means responsive to the pulsing of said trigger circuit for producing a time variable voltage at said control electrode; and
   (c) an element switchable into and out of said timing circuit means causing the time variable voltage produced thereby to reach said preselected value subsequent to pulsing of the trigger circuit after an interval of time longer than the response time of the human eye whereby the light is operable in a progressive mode;
   (d) said element when switched out of said timing circuit means causing the time variable voltage produced thereby to reach said preselected value subsequent to pulsing of the trigger circuit after an interval of time shorter than the response time of the human eye whereby the light is operable in a simultaneous mode.

4. A master/slave signal light according to claim 3 wherein said timing circuit means includes antenna means adjacent to said trigger circuit for detecting when the latter is pulsed.

5. A master/slave signal light according to claim 3 wherein said switch means is selectively settable at a first setting at which said oscillator means is enabled and said element is switched into said timing circuit means whereby the light is operable as a master in the progressive mode.

6. A master/slave signal light according to claim 3 wherein said switch means is selectively settable at a second setting at which said oscillator means is disabled and said element is switched into said timing circuit means whereby the light is operable as a slave in the progressive mode.

7. A master/slave signal light according to claim 3 wherein said switch means is selectively settable at a third setting at which said oscillator means is enabled and said element is switched out of said timing circuit means whereby the light is operable as a master in the simultaneous mode.

8. A master/slave signal light according to claim 3 wherein said switch means is selectively settable at a fourth setting at which said oscillator means is disabled and said element is switched out of said timing circuit means whereby the light is operable as a slave in the progressive mode.

9. A master/slave signal light according to claim 3 wherein said timing circuit means includes:
   (a) a one-shot multi-vibrator having a normally conductive active element and a normally non-conductive active element;
   (b) a capacitor shunting the control electrode of said pulse generator;
   (c) said capacitor also shunting said normally conductive active element whereby the voltage across said capacitor is normally held to a relatively low value less than said preselected value; and
   (d) means responsive to the pulsing of said trigger circuit causing conduction of the active elements of said multi-vibrator to switch for a fixed period of time whereby the voltage across said capacitor increases exponentially and reaches said preselected value within said fixed period of time.

10. A master/slave signal light according to claim 8 wherein the element switched into and out of said timing circuit comprises a resistor connected serially with said capacitor when said element is switched into the timing circuit.

11. A landing light system comprising:
  (a) a plurality of master/slave signal lights arranged in a predetermined pattern to identify a landing area and electrically connected in a serial manner;
  (b) each signal light having a triggerable flash tube and operable either in a master mode in which the tube is triggered periodically by a control circuit contained within the light, or in a slave mode in which the tube is triggered by an external trigger pulse;
  (c) one of said lights being operated in a master mode and the others being operated in a slave mode; and
  (d) each signal light producing a trigger pulse in response to triggering of its flash tube, which pulse is applied to the next serially connected signal light via the serial electrical connection.

12. A landing light system according to claim 11 wherein each signal light is provided with an incandescent lamp whose illumination is constant.

13. A landing light system comprising:
  (a) a plurality of signal lights arranged in a predetermined pattern to identify a landing area and electrically connected in a serial manner;
  (b) each signal light having a triggerable flash tube and circuitry for triggering said flash tube;
  (c) each of said signal lights producing a trigger pulse when its flash tube is triggered, which pulse is applied to the circuitry of the next serially connected signal light via the serial electrical connection for triggering the flash tube of said next serially connected signal light.

14. A landing light system according to claim 13 wherein said circuitry is constructed and arranged so that the triggering of the flash tube of said next serially connected signal light occurs a predetermined time after the triggering of the flash tube of the preceding signal light.

References Cited

UNITED STATES PATENTS

| | | | |
|---|---|---|---|
| 2,794,967 | 6/1957 | Coggins et al. | 340—331 |
| 3,288,044 | 11/1966 | Bramer. | |
| 3,411,036 | 11/1968 | Casey | 340—331 |

JOHN W. CALDWELL, Primary Examiner

H. S. COHEN, Assistant Examiner

U.S. Cl. X.R.

340—331; 315—241